Aug. 29, 1967 T. M. BOOTH 3,338,188

WAFER MAKING MACHINES

Filed May 26, 1965 3 Sheets-Sheet 1

INVENTOR
THOMAS M. BOOTH
BY
Browne, Schuyler & Beveridge
ATTORNEYS

INVENTOR
THOMAS M. BOOTH
BY
Browne, Schuyler & Beveridge
ATTORNEYS

Aug. 29, 1967 T. M. BOOTH 3,338,188

WAFER MAKING MACHINES

Filed May 26, 1965 3 Sheets-Sheet 3

INVENTOR

THOMAS M. BOOTH

BY

Browne, Schuyler + Beveridge

ATTORNEYS

United States Patent Office 3,338,188
Patented Aug. 29, 1967

3,338,188
WAFER MAKING MACHINES
Thomas Michael Booth, Haresfinch, St. Helens, England, assignor to T. & T. Vicars Limited, Newton-le-Willows, England
Filed May 26, 1965, Ser. No. 458,935
Claims priority, application Great Britain, May 30, 1964, 22,504/64
7 Claims. (Cl. 107—54)

ABSTRACT OF THE DISCLOSURE

A method and apparatus for removing wafers from separated mould plates which are moving continuously along a prescribed path, by directing a gaseous jet at the trailing edge of a wafer which is in one of the mould plates. The jet nozzle is movable toward the mould plates in a direction generally corresponding to the direction of movement of the mould plates.

The present invention relates to an apparatus for discharging wafers and the like baked products from a wafer making machine of the type in which hinged upper and lower paired mould plates are connected in an endless chain and moved in a path which includes passage through an oven, each upper plate being lowered and clamped on to its associated lower plate after the latter has been charged with wafer batter at a charging station, prior to entering the oven, and being unclamped and raised from the lower plate (after passage through the oven) as the plates reapproach the charging station whereby the cooked wafer is dischargeable from the opened plates by gravity after the wafer has been freed or loosened from the lower mould plate surface.

In the art of wafer manufacture, it is known to provide a wafer making machine of the above-identified type wherein air jet means are provided and disposed so as to direct a localised jet of compressed air at an angle to the plane of a wafer such that the jet of air impinges against the approaching leading edge only of each lower wafer plate at its junction with the wafer as its associated upper plate is lifted. With such a method extreme care must be taken to ensure that the jet of air is directed onto the wafer at exactly the right time.

According to the present invention, apparatus for discharging wafers and the like baked products from a wafer making machine of the type indicated, comprises air jet means arranged so as to be operable to follow each pair of mould plates, in turn, along part of the path of movement thereof such that the point in the path of the mould plates at which the upper mould plate is lifted from its associated lower mould plate the air jet means are positioned so as to impinge a jet of compressed air at an angle to the plane of the wafer against the trailing edge only thereof, whereby the wafer is freed from the lower mould plate and drops therefrom under gravity.

The plates of each pair of mould plates are arranged to be opened as the plates move upwardly around an arcuate bend in the closed path in which they move, and the air jet means, in the form of one or more air jet nozzles, are mounted at one end of a movable carriage which is adapted to move towards the plates and then to move upwardly behind the plates as they negotiate the bend. Air jets are then directed by the or each air jet nozzle onto the trailing edge of the wafer to remove it from the mould plates, whereafter the carriage and the air jet means are retracted to their original position and the cycle of movements is then repeated with the following mould plates.

Preferably, in order to synchronise the movement of the carriage with that of the mould plates, the drive of the carriage is taken from the drive of the pairs of mould plates.

Conveniently, the upper surface of the carriage acts to guide wafers after they have been discharged from the mould plates to a collecting box in which they are stacked.

The invention will be further described by way of example with reference to the accompanying drawings, in which.

Figure 1:
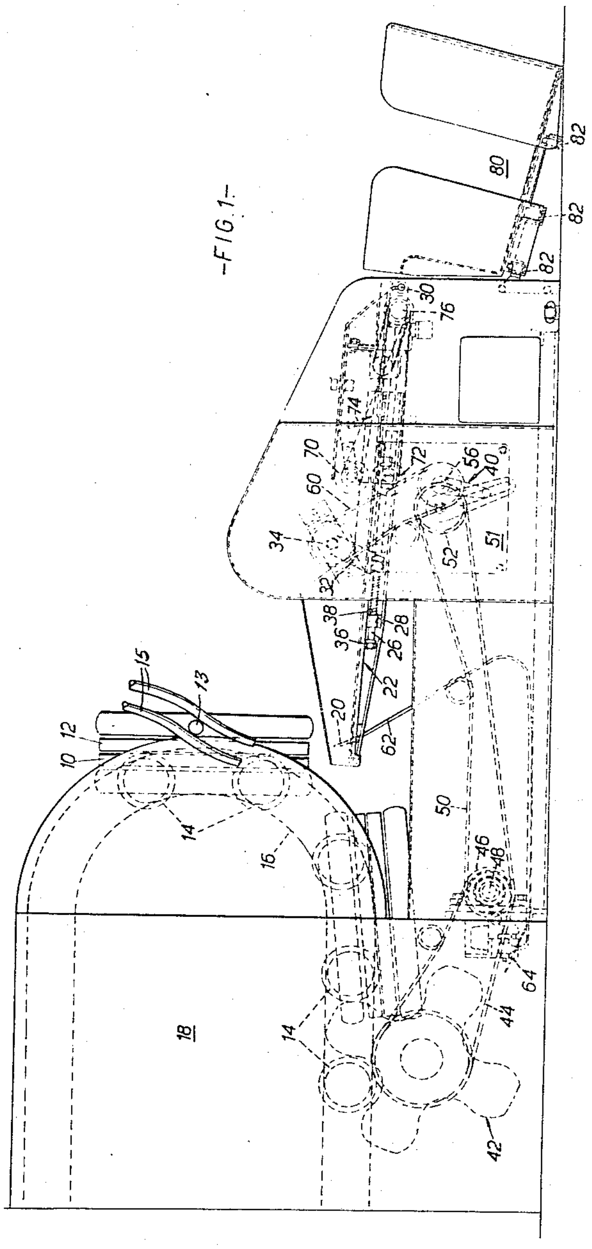
FIG. 1 is a partial side elevation of one end of a conventional wafer making machine with the apparatus for discharging wafers from the wafer mould plates thereof, according to the present invention.
Figure 2:
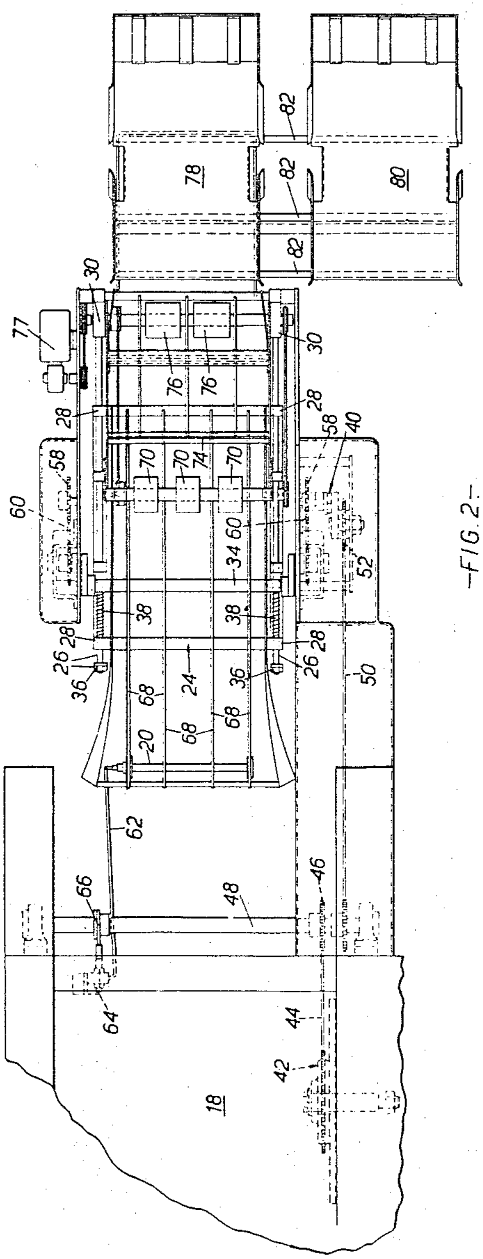
FIG. 2 is a plan view of FIG. 1, with the wafer mould plates omitted for clarity.
Figure 3:
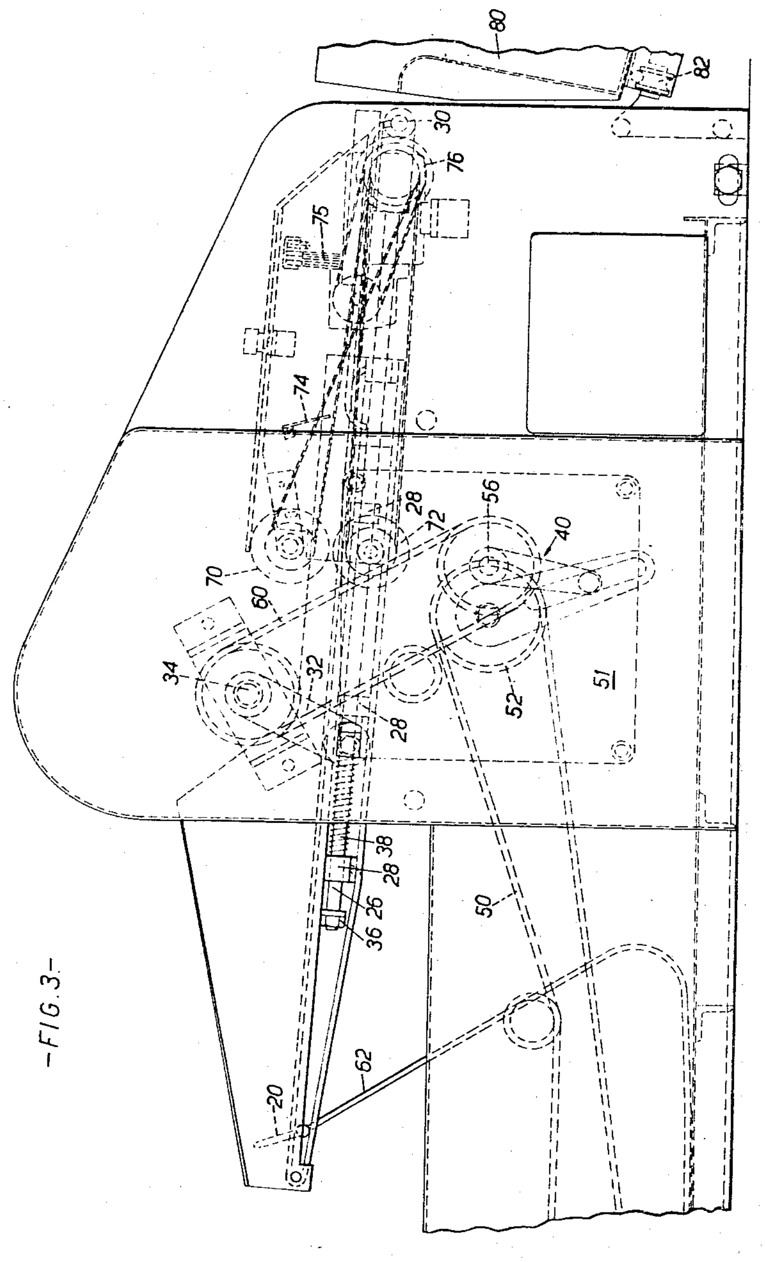
FIG. 3 is an enlarged view of the apparatus for discharging wafers as illustrated in FIG. 1.

Referring to FIG. 1, a conventional wafer making machine comprises an endless chain of pairs of wafer mould plates each of which consists of an upper plate 12 and a lower plate 10 which is mounted upon rollers 14 for movement along guide tracks 16. Each pair of wafer mould plates is adapted to mould and cook a wafer therein between the plates 10 and 12 thereof during movement around a closed path which passes through a heated oven space 18. The plates 10 and 12 of each wafer mould are opened as it moves upwardly around the arcuate bend, shown in FIG. 1, during which movement, according to the invention, air jet means are operable to follow the open mould plates 10 and 12 of the wafer mould and at a specific point along said bend impinge a jet of compressed air onto the trailing edge of the wafer at an angle to the plane of the wafer. The moulds are hinged together and opened in a conventional manner by the follower 13 attached to one mould plate and which rides between the trackways 15 as illustrated in FIG. 1.

Apparatus for discharging the wafers from the conventional wafer making machine as described above comprises air jet means in the form of a plurality of air jet nozzles 20 mounted on a movable carriage 22 which is drivable in a reciprocable manner. The movement of the carriage 22 is such that as a pair of mould plates move around the arcuate bend the carriage 22 is projected towards the wafer making machine (that is, towards the left as viewed in FIG. 1) and then is moved upwardly so as to follow the pair of mould plates. At a specific point towards the upper region of the arcuate bend the air jet nozzles 20 are operated to remove the wafer from the mould plates, whereafter the carriage 22 is withdrawn downwardly and away from the wafer making machine to a retracted position, from where its cycle of movement is repeated as the next pair of mould plates commence to move around the arcuate bend.

The carriage 22 comprises a rigid frame structure generally indicated 24 which is slidably mounted on parallel support members 26 by means of bearing blocks 28. The support members 26 are pivotally mounted at 30. Each one of a pair of driving or crank arms 32 are connected at one end thereof to the carriage 22 and at the other end thereof to a common rotatable driving spindle 34 mounted in the framework of the apparatus. The rotary or circular motion of the crank arms 32 initially projects the carriage 22 along the support members 26 towards the wafer making machine. The movement of the carriage 22 in this direction is limited by stops 36 on the support members 26. A lost motion device comprising a spring 38 arranged around each support member 26 is provided so that on further movement of the crank arms 32 the forward movement of the carriage has an upward component and the support members 26 pivot upwardly about the pivots 30. As the forward component of movement of the carriage 22 is arrested by the lost motion devices, the end of the carriage 22 on which the air jet nozzles 20 are mounted follows a substantially upwardly vertical path. When the carriage 22 has reached its highest position, further movement of the crank arms 32 causes the carriage 22 to move away from the wafer making machine along the support members 26 as they are pivoted downwardly about the pivots 30. This return movement of the carriage 22 is carried out at a faster speed than its projected movement by means of a conventional quick return mechanism illustrated generally as 40.

In the embodiment illustrated in the drawings, the drives of the endless chain of mould plates of the conventional wafer making machine and the movable carriage 22 are synchronised. This is achieved by the provision of a star wheel assembly 42 which is rotated by the rollers 14 as they move in the guide tracks 16 and which is connected via a chain drive 44 to a chain wheel 46 mounted at one end of a timing shaft 48. The shaft 48 drives via chain drive 50 a chain wheel 52 mounted on the supporting structure 51 of the wafer discharge apparatus, which chain wheel 52 is connected to the quick return mechanism 40. The quick return mechanism 40 is connected to a rotary shaft 56 mounted transversely of the structure 51 and at each end of the shaft 56 is a chain wheel 58 which drives via a chain drive 60 a crank arm 32 of the carriage 22.

The assembly of air jet nozzles 20 mounted at the front end of the carriage 22 is connected via a flexible air line 62 and an air valve 64 to a source of air under pressure (not shown). The opening of the valve 64 is controlled by a cam 66 mounted on the timing shaft 48. The valve 64 is opened to allow compressed air to flow to the air jet nozzles 20 when the carriage 22 is positioned to blow a wafer from between the plates 10 and 12 of a wafer mould.

The air jet nozzles 20 are operated when a pair of wafer mould plates are approaching the top of the arcuate bend (shown in FIG. 1) so that the wafer is removed from the lower plate 10 while it is still inclined at a sufficiently steep angle to drop by gravity from the plate 10. The inclination of the air jets to the plane of the wafer as they impinge on the trailing edge thereof causes the wafer to "flutter" whereby it is freed from the lower plate 10 and scrap is removed from the edges of the wafer.

The freed wafer is collected by the carriage 22 which is provided with a grid-like surface of cylindrical rod members 68 which run longitudinally of the carriage 22. Since the carriage 22 is upwardly inclined towards the wafer making machine at the instant it receives the wafer, the wafer slides down the grid-like surface towards the end of the carriage 22 remote from the air jet nozzles 20. To assist the movement of the wafer down the carriage 22, upper and lower sets of roller brushes 70, 72, respectively are mounted approximately mid-way along the grid-like surface. The upper roller brushes 70 are disposed above this surface and the lower roller brushes 72 are disposed below this surface, but the peripheries of the roller brushes 70, 72 are positioned such that they bear slightly on the wafer and propel it along the surface. The wafer then passes under a scraper 74, and a brush 75, whereby any remaining scrap is removed, and thereafter pass over roller brushes 76 which give added momentum to the wafer to direct it into a collecting box. The roller brushes 70, 72 and 76 may conveniently be driven by an electric motor 77.

Preferably, two collecting boxes 78, 80 are movably mounted on parallel tracks 82 which extend at right angles to the longitudinal axis of the carriage 22, so that one box may be emptied whilst the other is being filled with wafers.

The apparatus of the present invention may form part of a wafer making machine or may be incorporated in an existing machine. In the latter case, of course, it will be appreciated that the drive of the carriage 22 may not necessarily be taken from the wafer making machine as hereinbefore described since various means of synchronisation may be employed.

I claim:

1. In an apparatus for discharging wafers and the like baked products from between moving separable upper and lower paired mould plates, the improvement which comprises movable air jet means, and means for moving said air jet means in a direction generally aligned with the direction of movement of the mould plates toward the trailing edge of a moving pair of said mould plates, and actuating means to operate said air jet means at a point in the path of the mould plates at which the upper mould plate is lifted from its associated lower mould plate to impinge a jet of compressed air at an angle to the plane of the wafer against the trailing edge only thereof, whereby to cause the wafer to be freed from the lower mould plate.

2. In an apparatus for discharging wafers and the like baked products from between moving separable upper and lower paired mould plates, the improvement which comprises at least one movable air jet nozzle, means for moving said air jet nozzle in a direction generally aligned with the direction of movement of the mould plates toward the trailing edge of a moving pair of said mould plates, compressed air supply means connected to each said nozzle and actuating means to operate each said air jet nozzle at a point in the path of the mould plates at which the upper mould plate is lifted from its associated lower mould plate to allow a jet of air from said compressed air supply means to pass through each said jet nozzle and to impinge at an angle to the plane of the wafer against the trailing edge only thereof, whereby to cause the wafer to be freed from the lower mould plate.

3. In an apparatus for discharging wafers and the like baked products from between moving separable upper and lower paired mould plates, the improvement which comprises a displaceable carriage, a plurality of air jet nozzles mounted on said carriage, means for moving said carriage and said air jet nozzles in a direction generally aligned with the direction of movement of the mould plates toward the trailing edge of a moving pair of said mould plates, compressed air supply means connected to each said nozzle and actuating means to operate each air jet nozzle at a point in the path of the mould plates at which the upper mould plate is lifted from its associated lower mould plate to allow a jet of air from said compressed air supply means to pass through each said air jet nozzle and to impinge at an angle to the plane of the wafer against the trailing edge only thereof, whereby to cause the wafer to be freed from the lower mould plate.

4. An apparatus according to claim 3, wherein an upper surface of said carriage is shaped to act as a guide for wafers after they have been discharged from the mould plates whereby they are directed into a collecting box.

5. In an apparatus for discharging wafers and the like baked products from between moving separable upper and lower paired mould plates, the improvement which comprises a displaceable carriage, a common drive means for moving said carriage and moving said mould plates, at least one movable air jet nozzle mounted on said carriage and arranged so as to be operable to follow each pair of mould plates in turn, along part of its path of movement, compressed air supply means connected to each said nozzle and actuating means to operate each air jet nozzle at a point in the path of the mould plates at which the upper mould plate is lifted from its associated lower mould plate to allow a jet of air from said compressed air supply means to pass through each said air jet nozzle and to impinge at an angle to the plane of the wafer against the trailing edge only thereof, whereby to cause the wafer to be freed from the lower mould plate.

6. An apparatus according to claim 5, wherein an upper surface of said carriage is shaped to act as a guide for wafers after they have been discharged from the mould plates whereby they are directed into a collecting box.

7. The method of discharging wafers and like baked products from between a pair of separated mould plates which are moving along a path in a given direction by impinging a gaseous jet from a jet means against a product in one of said mould plates, comprising, the steps of moving said jet means towards said mould plates in generally said given direction and impinging a said gaseous jet from said jet means against the trailing edge of a product at an angle to the plane of a product in one of said separated mould plates; whereby the product is freed from its said mould plate and drops therefrom by gravity.

References Cited

UNITED STATES PATENTS

| | | | |
|---|---|---|---|
| 1,164,566 | 12/1915 | Aunes. | |
| 2,203,851 | 6/1940 | Tucci | 118—323 |
| 2,271,937 | 2/1942 | Engels | 214—310 |
| 2,750,875 | 6/1956 | Finlayson | 107—58 X |
| 2,962,984 | 12/1960 | Noel | 107—57 |

FOREIGN PATENTS

| | | |
|---|---|---|
| 1,043,636 | 6/1953 | France. |
| 269,551 | 8/1927 | Great Britain. |
| 814,208 | 6/1959 | Great Britain. |

BILLY J. WILHITE, *Primary Examiner.*